United States Patent [19]

Wilhelm

[11] 4,175,754
[45] Nov. 27, 1979

[54] SEAL FOR FLUID DUCTS

[75] Inventor: William E. Wilhelm, Marietta, Ga.

[73] Assignee: Lockheed Corporation, Burbank, Calif.

[21] Appl. No.: 903,931

[22] Filed: May 8, 1978

[51] Int. Cl.² .......................... F16L 51/04; F16J 15/08
[52] U.S. Cl. ................................. 277/128; 277/206 R;
277/236; 285/229; 285/328; 285/367;
285/DIG. 18
[58] Field of Search .................... 277/126, 128, 206 R,
277/236; 285/229, 328, 365–367, 370, 397, 407,
408, DIG. 18

[56] References Cited

U.S. PATENT DOCUMENTS

| | | | |
|---|---|---|---|
| 2,739,828 | 3/1956 | Schindler et al. | 285/229 X |
| 2,896,978 | 7/1959 | Schumacher | 285/408 |
| 2,937,893 | 5/1960 | Hill et al. | 285/328 |
| 3,180,662 | 4/1965 | Parlasca et al. | 285/367 X |
| 3,674,291 | 7/1972 | Goldberg | 285/328 X |

FOREIGN PATENT DOCUMENTS

| | | | |
|---|---|---|---|
| 614140 | 6/1935 | Fed. Rep. of Germany | 285/DIG. 18 |
| 1273930 | 7/1968 | Fed. Rep. of Germany | 285/229 |
| 1285807 | 12/1968 | Fed. Rep. of Germany | 285/365 |
| 746789 | 3/1956 | United Kingdom | 285/367 |

*Primary Examiner*—Robert S. Ward, Jr.
*Attorney, Agent, or Firm*—John J. Sullivan

[57] ABSTRACT

An effective seal is provided which fulfills the requirement for a trouble free joint, particularly "V" band joints which are dependent on accurately controlled tube end flanges. Rolled sheet metal flanges are particularly subject to excessive leakages due to deformation during handling and installation. The normal tendency to stop leakage on any joint is by additional torque of the coupling. With the rolled sheet metal flanges, this causes additional deflection of the flange and aggravates the leakage problem rather than reducing it. Furthermore on aircraft environment systems leaks are extremely difficult to pinpoint and time consuming to repair.

3 Claims, 3 Drawing Figures

SEAL FOR FLUID DUCTS

This invention relates to seals generally and more particularly to seals of the type employed in the interconnection of the ends of fluid conveying ducts to assure against subsequent fluid leakage therefrom.

While the present seal is designed and adapted for use generally it has particular application to and utility in high pressure ducts which are configured at their ends with flange elements which abut and around which a retaining coupling is secured to seal the joint while reacting the high duct tension loads (axial) created by the high pressure. To this end each duct flange and the corresponding surfaces of the coupling coact one with the other along ramped surfaces so that as the coupling diameter is reduced by tightening a tangential bolt, an axial force is applied to wedge the duct flanges together causing them to deform in a predetermined manner. If assembled properly, i.e., if the duct flanges are aligned during tightening of the tangential bolt a leak-tight joint is effected when the prescribed torque is reached. In practice, however, proper assembly is not always obtained and the natural tendency when an objectionable leak is detected is to correct this by overtorquing the clamp and damage results.

Efforts to correct the foregoing situation by especially designing the coacting flange and coupling surfaces to assure the proper interconnection have reduced the probabilities to a degree but have not been altogether satisfactory. Moreover, there is insufficient space for the application of conventional gasket and seals to such joints.

The present invention, therefore, is directed to a seal capable of use in the interconnection of standard high pressure duct ends and associated couplings. This proposed seal is so designed and constructed that it automatically compensates for improper assembly of the clamp about the flanges if this occurs either during original installation or subsequent reassembly.

To the above ends the seal herein proposed is configured with complemental surfaces for coaction with adjacent surfaces of the duct flanges to bring the ducts into a predetermined position of alignment commensurate with optimum sealing. In addition this seal includes special means to confine even the slightest leakage occasioned by any deviations from the predetermined position which may occur during the assembly or reassembly of the coupling on and about the duct ends.

More specifically, the instant seal is annular having opposite sides sized to accommodate and abut the associated duct flanges to be joined, each side terminating at one end in a lateral outward extension adapted to be disposed internally of the ducts and at the other end interconnected with the other side in a generally bulbous extension adapted to be disposed externally of the ducts. Inwardly of both the lateral extensions and the bulbous extension the seal is formed or otherwise provided with cam surfaces designed and adapted to contact with the outer duct flange surfaces as the ducts are brought together and to control and direct their movement into a selected, relative position as the overlying and surrounding clamp is installed. In the final, assembled position the bulbous extension of the seal is located between the exterior of the joined ducts and the clamp where it serves to contain any fluid which may escape from the duct out between the junction of the duct flanges as defined by the opposite seal sides.

The seal envisioned herein is termed a "live" seal, i.e., one which permits the admission of fluid internally where it is trapped against leakage from the part being sealed. Within the known state of the art live seals have been employed which are a tubular annulus with perforations in the wall along one side to admit fluid to the interior thereof. So far as it is known, none of these existing live seals include specially designed side surfaces to facilitate the installation thereof in an assembled joint, a salient feature of the present invention.

With the above and other objects in view as will become more apparent, this invention consists in the construction, arrangement and combination of parts, all as hereinafter more fully described, claimed and illustrated in the accompanying drawings wherein:

Figure 1:
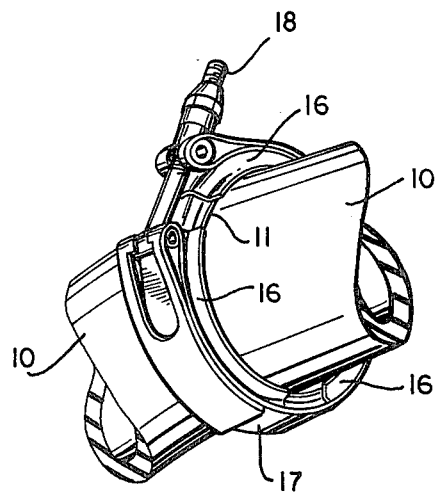
FIG. 1 is a perspective view of a pair of duct ends interconnected by a typical coupling employed for the purpose to show the assembly therein of a seal in accordance with the teachings of this invention.
Figure 3:
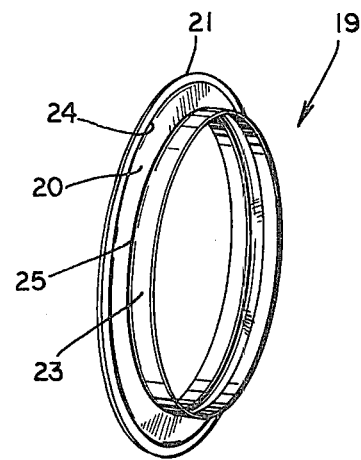
FIG. 3 is a perspective view of the seal alone removed from the assembly shown in FIGS. 1 and 2.
Figure 2:
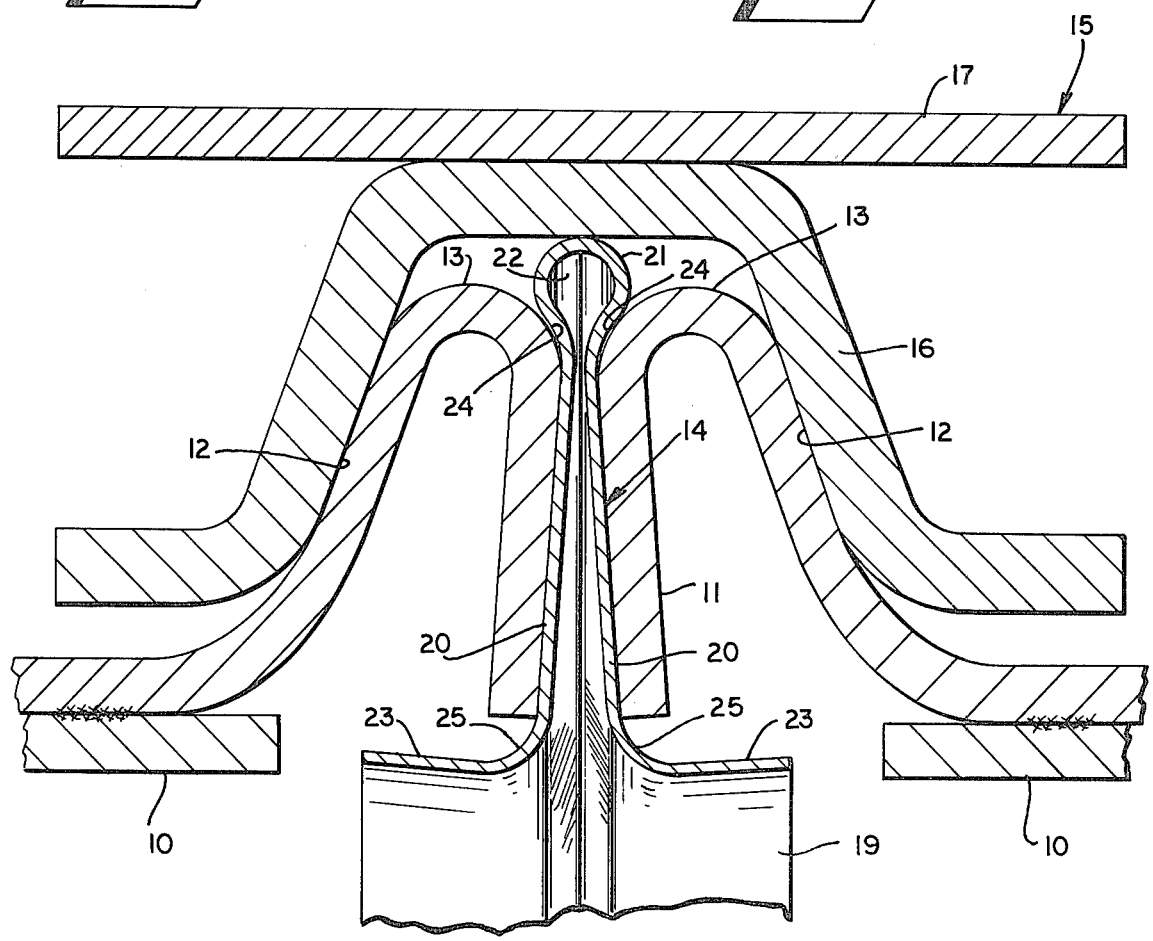
FIG. 2 is a transverse section taken across the coupling as installed in the assembly of FIG. 1 to show engagement by the coupling of the duct ends with the instant seal therebetween.

Referring more particularly to the drawings, 10 designates a pair of ducts to be interconnected in end to end relation. At its end each duct 10 terminates in a flange 11 which is secured by welding or the equivalent to constitute, in effect, an integral part of the associated duct 10. Each flange 11 is defined by a sloping outer surface 12 disposed at an obtuse angle relative to the adjacent duct 10 and an arcuate peripheral surface 13 terminating in a substantially ninety degree (90°) surface 14 relative to the adjacent duct 10.

When the ducts 10 are brought together in end to end relation their surfaces 14 abut. With the ducts 10 thus disposed a surrounding coupling 15 is employed to secure the ducts 10 in unitary assembly. To this end the coupling 15 comprises a plurality of generally, "V" shaped retainers 16 secured to, as by welding or the equivalent, to a band 17 at its base and a tightening bolt 18 across the ends of the band 17. The "V" retainers 16 are adapted to overlie and contain the flange surfaces 12 of the ducts 10 and the internal surfaces of the arms thereof apply a wedging action on such surfaces 12 when the bolt 18 is tightened and the diameter of the coupling 15 thereby reduced.

In accordance with the teachings of this invention, a seal 19 is incorporated in the assembly as above described, being disposed between the surfaces 14 of the ducts 10 prior to installation of the coupling 15. This seal 19 is annular, being configured to conform to the diameter of the ducts 10 as established by their surfaces 13 and 14. Thus the seal 19 is formed by relatively flat sides 20 interconnected at one side by an integral loop 21 defining an internal generally circular chamber 22 and terminating at the other sides in lateral, outward extensions 23. The sides 20 each have a dimension substantially equal to that of each flange surface 14 defined by arcuate surfaces 24 and 25 between such sides 20 and the respective loop 21 and flanges 23. The arcuate surfaces 24 are contoured to conform to the peripheral flange surfaces 13 to thereby act as cams to control movement of the flanges 11 with respect to each other and to the seal 19 upon tightening of the coupling bolt 18.

In view of the foregoing design and construction the ultimate joint serves to prevent leakage of fluid within the ducts 10. While fluid may seep into the joint between the sides 20 of the seal 19 it becomes trapped within the chamber 22 which will tend to expand or balloon but is fabricated to withstand failure under operational conditions. Such action in opposition to the clamping action of the coupling 15 on the flanges 11 through the wedging action of the retainers 16 on the flanges 11 enhances sealing of the ultimate joint.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A seal to prevent the leakage of fluid from ducts connected end to end across flanges carried by the connected ducts, said seal being formed by a pair of sides having dimensions substantially equal to and in surface to surface abutment with the adjacent faces of said flanges throughout substantially the entire area thereof, said sides being interconnected at and along one edge by an integral wall disposed outwardly of said flanges and defining an internal chamber, said sides further terminating at and along their other edges in integral extensions laterally disposed in diverse directions.

2. The seal of claim 1 including a first arcuate surface between each said side and said integral wall corresponding to and coacting with a wall on the associated flange aforesaid to act as a cam surface thereon to thereby cause said flange and seal to locate in a predetermined relative position when said ducts are connected as aforesaid.

3. The seal of claim 2 including a second arcuate surface between each said side and the associated said laterally disposed extension to coact with the associated duct flange to act in opposition to said first arcuate surface and thereby facilitate the connection of said ducts in the predetermined relative position as aforesaid.

* * * * *